March 30, 1965 L. M. WALLACE ETAL 3,175,834
BALL JOINT SEAL
Filed June 1, 1961 3 Sheets-Sheet 1
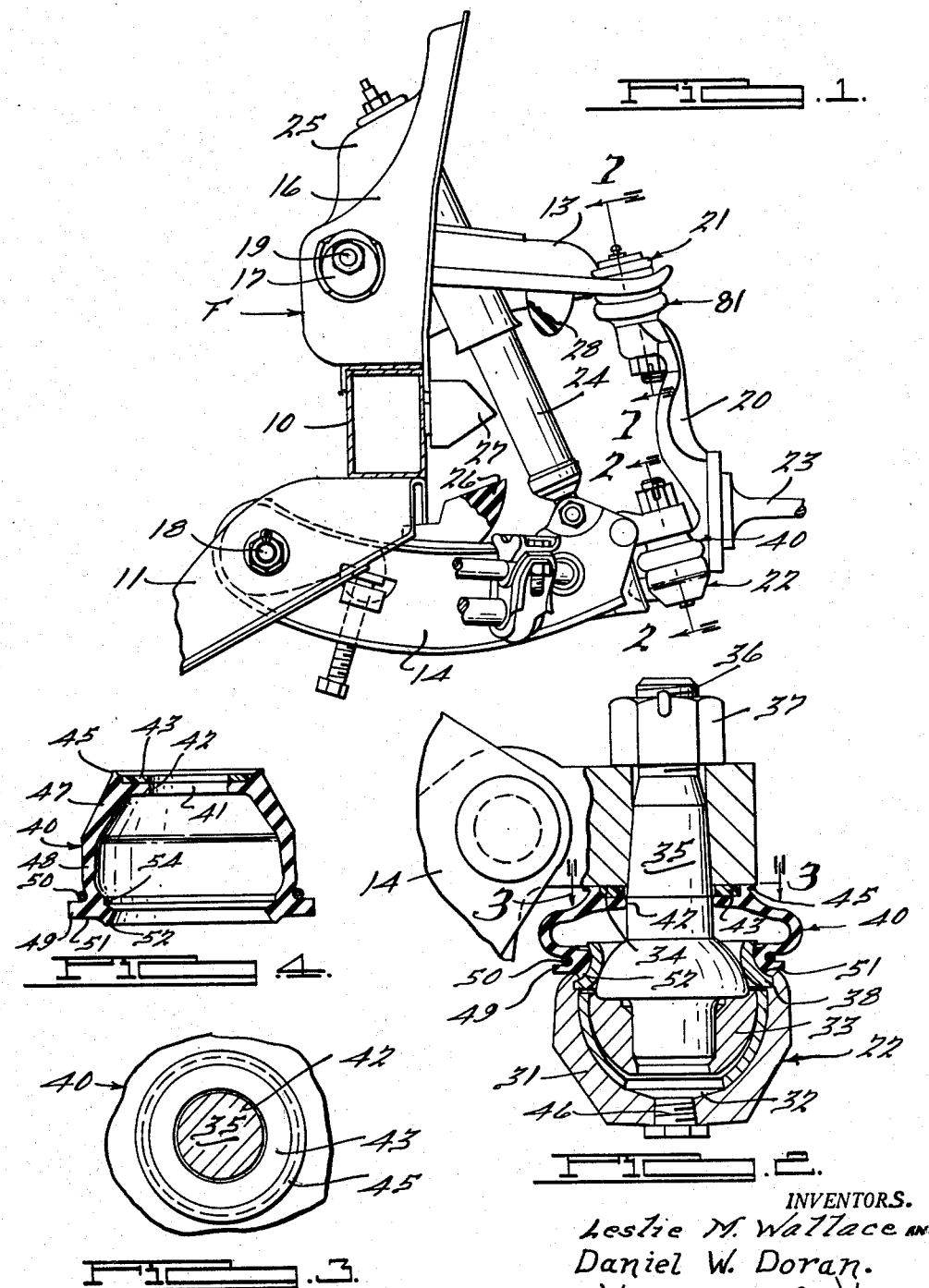
INVENTORS.
Leslie M. Wallace and
Daniel W. Doran.
By: Harness and Harris
ATTORNEYS.

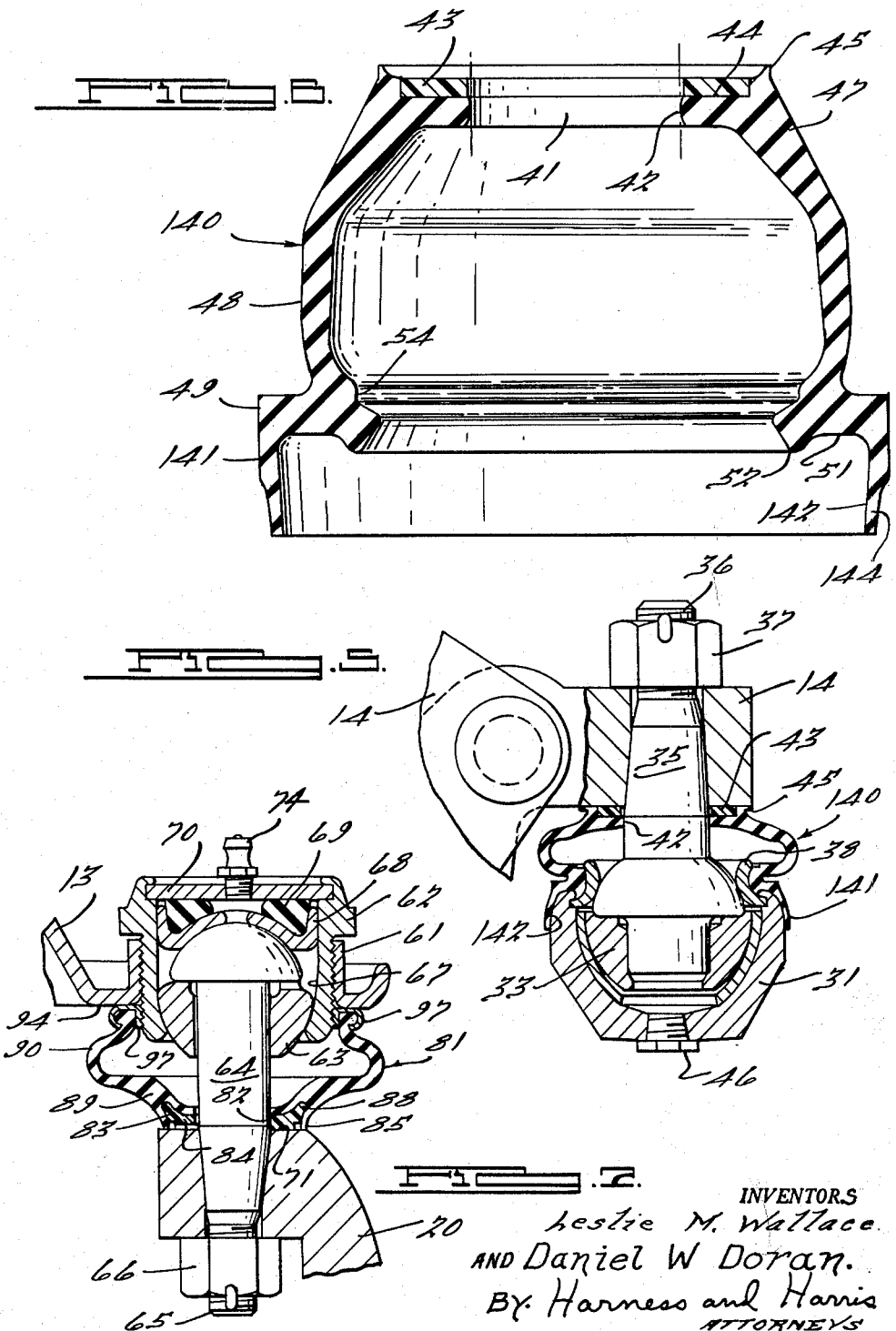

March 30, 1965  L. M. WALLACE ETAL  3,175,834
BALL JOINT SEAL
Filed June 1, 1961                                    3 Sheets-Sheet 3
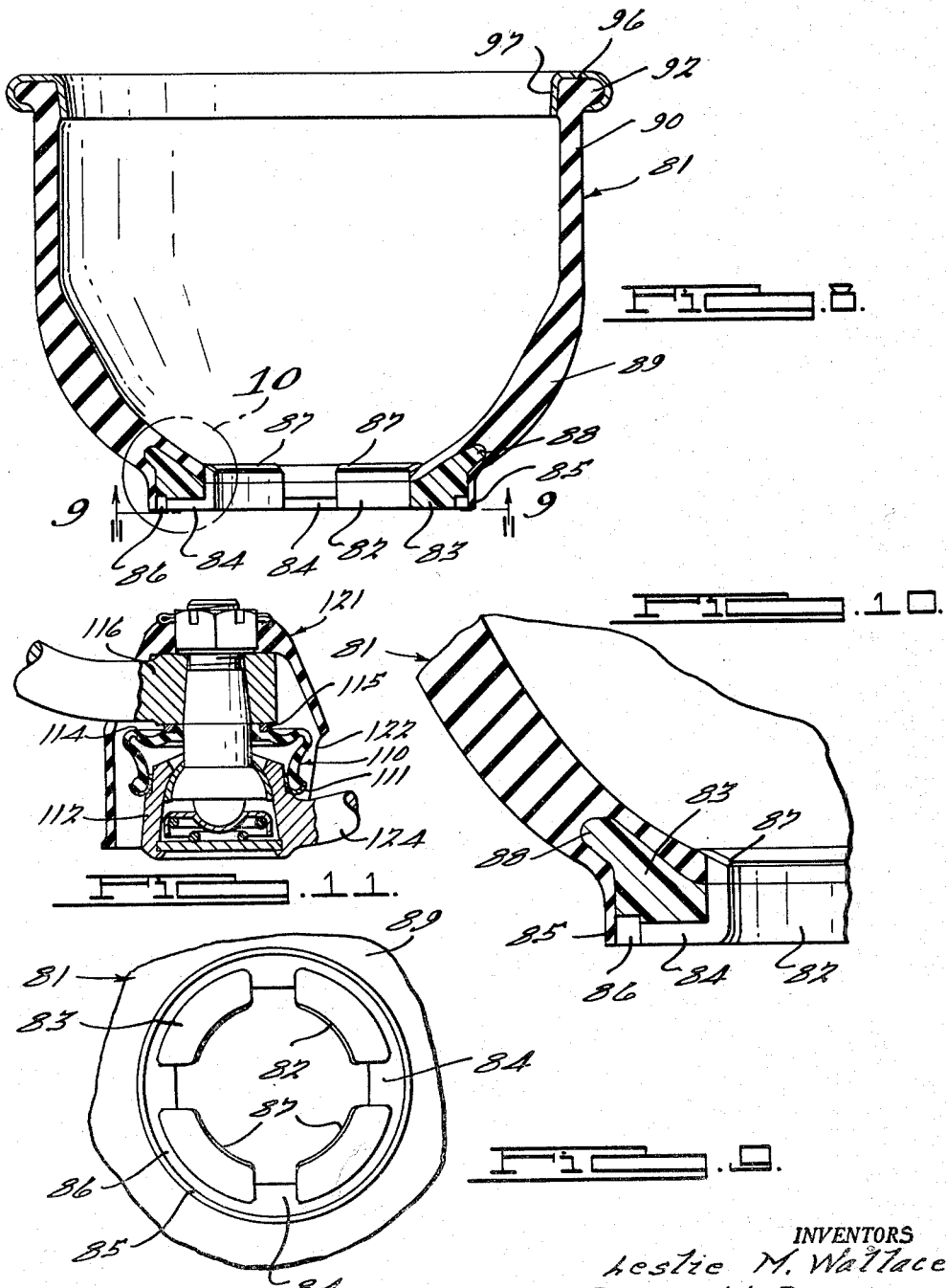
INVENTORS
Leslie M. Wallace
AND Daniel W. Doran.
BY Harness and Harris
ATTORNEYS.

United States Patent Office 3,175,834
Patented Mar. 30, 1965

3,175,834
BALL JOINT SEAL
Leslie M. Wallace, Detroit, and Daniel W. Doran, Madison Heights, Mich., assignors to Chrysler Corporation, Highland Park, Mich., a corporation of Delaware
Filed June 1, 1961, Ser. No. 114,075
5 Claims. (Cl. 277—212)

This invention relates to ball joint seals and particularly to seals of the type used on motor vehicle suspension and tie rod ball joint assemblies.

It is a primary object of this invention to provide ball joint, balloon-type, flexible seals, that give maximum sealing against the ingress to the joint interior of dirt, water or other foreign matter while providing for complete freedom of movement between the joint connected elements and retention of the seal enclosed lubricant.

It is another object of this invention to provide an improved type of ball joint seal that will lend itself to so-called permanent or semi-permanent joint lubrication.

It is another object of this invention to provide a flexible, balloon-type, lubricant retaining, ball joint seal that lends itself to reliable sealing with maximum joint flexibility while resisting any tendency of the seal to collapse or to leak the lubricant supplied to the interior of the seal.

It is still another object of this invention to provide a stud mounted, balloon-type, lubricant retaining seal that has improved sealing portions to engage the associated stud and ball joint housing or casing so that maximum sealing with minimum wear may be achieved in a seal design that is economical to manufacture and easy to install.

Other objects and advantages of this invention will become readily apparent from a reading of the following description and a consideration of the related drawings wherein:

FIG. 1 is a sectional elevational view of a vehicle independent wheel suspension having ball joint assemblies embodying one form of this invention;

FIG. 2 is an enlarged sectional elevational view of the suspension lower ball joint assembly shown in FIG. 1, the view being taken along the line and in the direction of the arrows 2—2 of FIG. 1;

FIG. 3 is a fragmentary sectional elevational view taken along the line and in the direction of the arrows 3—3 of FIG. 2;

FIG. 4 is a sectional elevational view of the seal shown in FIG. 2, showing the seal in its normal unstressed condition;

FIG. 5 is a sectional elevational view of a modified form of lower ball joint seal similar to that shown in FIG. 2;

FIG. 6 is an enlarged cross sectional view of the balloon-type boot seal of FIG. 5 shown in its normal free standing shape;

FIG. 7 is an enlarged sectional elevational view of the suspension upper ball joint assembly shown in FIG. 1, the view being taken on the line and in the direction of the arrows 7—7 of FIG. 1;

FIG. 8 is an enlarged cross sectional view of the balloon-type boot seal of FIG. 7 shown in its normal free standing shape;

FIG. 9 is a bottom plan elevation taken along the line and in the direction of the arrows 9—9 of FIG. 8;

FIG. 10 is an enlarged fragmentary sectional elevational view of the portion of the boot shown within the circle 10 of FIG. 8;

FIG. 11 is a fragmentary sectional elevational view of the application of one form of this invention to a tie rod ball joint connection.

FIG. 1 of the drawings shows a portion of a motor vehicle wheel supporting frame F that includes a longitudinally extending side rail 10 and a transversely extending cross rail 11. Extending outwardly from and transversely of the side rail 10 and pivotally connected to a frame F for swinging movement about longitudinally extending pivot axes are upper and lower wheel supporting control arms 13 and 14 respectively. Upper control arm 13, which is substantially V-shaped in plan, is mounted on the frame side rail 10 by means of upstanding brackets 16 that support pivot pins 19 which include caster and camber adjustment means 17. Adjustment means 17 form no part of this invention. The disclosed adjustment means 17 is described in detail in the Robert H. Kushler et al. U.S. Patent 2,954,998 dated October 4, 1960. The lower control arm 14 is pivotally mounted on a cantilever-type pivot shaft 18 that is supported by the frame cross rail 11. This pivot shaft 18 and its associated torsion bar are disclosed in the patent of John E. Collier et al. No. 2,972,489 dated February 21, 1961, and this particular pivot structure forms no part of this invention.

Control arms 13 and 14 have a wheel supporting knuckle 20 pivotally connected thereto by means of upper and lower ball joint connections 21 and 22 respectively. Knuckle 20 mounts a spindle 23 that is adapted to rotatably support a wheel (not shown). A shock absorber unit 24 is connected between the lower control arm 14 and a housing 25 seated on the frame side rail 10. Pivotal movement of the control arms 13, 14 is limited by engagement of the resilient bumpers 28, 26 with the frame mounted bumper bracket 27.

FIG. 2 is an enlarged fragmentary view of the lower control arm ball joint assembly 22. This ball joint assembly includes a housing 31 having a substantially hemispherical cavity 32 therein that is adapted to rotatably journal the ball-like head 33 of the stud 35. Stud 35 has the threaded end 36 of its shank portion fixedly connected to the lower control arm 14 by means of a nut 37. The upper end of the ball joint housing 33 has an integral flange-like collar 38 that provides a suitable outer surface against which to seat the lower end of the flexible, balloon-type, seal 40. It is the balloon seal 40 (see FIGS. 2–4) that embodies one form of this invention.

Balloon seal 40, as well as the other balloon seals hereafter described, is of rubber-like material and it has been found that a high quality molded neoprene rubber is particularly suitable for balloon seals of the type herein disclosed. Seal 40 is of substantially inverted cup shape with an opening 41 in the top wall to sealingly receive the shank portion of the stud 35. The seal top material that provides the peripheral wall around the opening 41 is convexly arched as shown at 42 in FIG. 4 so that this portion provides in effect an O-ring seal against the shank of the stud 35. Countersunk in the top of the seal 40 is a wear resistant plastic washer 43 of nylon or some similar self-lubricating, wear resistant, bearing material. The washer 43 is bonded to or otherwise fixedly connected to the seal top surface 44. From FIG. 2 it will be seen that the exposed upper surface of the washer 43 sealingly seats against the lower surface 34 of the control arm 14. Due to the fact that the seal 40 has an upwardly projecting lip or flange portion 45 surrounding the outer periphery of the washer 43, a second seal is provided against the surface 34 that excludes dirt and water from the surface of washer 43 to prevent wear thereof. Because the lip seal 45 is shaped as it is, it is thought to be obvious (see FIG. 2) that the lip 45 will be bent radially outwardly when the seal 40 is compressed against the underside surface 34 of the control arm 14. This outward folding of the lip seal 45 is an advantage in letting lubricating grease, or the like, within the seal 40 bleed out of the seal around the lip 45 so as to prevent rupturing of the seal in the event an excess of lubricant has been introduced to the ball joint and seal interior through the removable plug or grease fitting 46.

From FIG. 4 it will also be noted that the seal side walls are shaped so as to resist rupturing and to maintain the optimum shape during service. The top portions 47 of the seal side walls are relatively thick adjacent the seal top 44 and diverge downwardly while at the same time reducing in wall thickness until the point is reached where the seal side wall becomes substantially vertical. The vertical wall portion 48 is a cylinder of substantially uniform wall thickness and it extends from the termination of the diverging upper wall portions 47 to substantially the bottom of the seal. At the lower end of the vertical wall portion 48 the seal walls thicken out to form a radially outwardly extending collar or flange 49. The angle between the outer side of the vertical side wall 48 and the top side of the collar 49 provides a seat for a wire ring or garter spring 50 that is used to positively anchor the lower wall portions of the seal 40 to the housing flange 38. The underside 51 of the collar 49 is adapted to sealingly seat on the top of the housing 31. The side wall of the seal 40 terminates at the bottom in a downwardly projecting lip portion 52 that cooperates with the collar 49 to provide a double seal at the bottom of the seal so that there is a double seal at both the top and bottom of the balloon-type seal unit 40. The step formation 54 at the interior side of the seal bottom wall provides a double seal against the casing portion 38.

FIGS. 5 and 6 show a balloon-type seal 140 that is a modified form of the seal 40 shown in FIGS. 2–4. The only difference between these two forms of balloon seal is that the FIGS. 5 and 6 form includes all of the structure of the FIGS. 2–4 seal and in addition includes a depending sealing lip 141. All parts of the FIGS. 5 and 6 seal that are common to the FIGS. 2–4 seal bear the same reference numerals as in FIGS. 2–4. The depending sealing collar or lip 141 has a downwardly and radially inwardly converging inner wall 142 so that it will sealingly grip the outer face of the housing 31. The collar 141 is of such a length and shape that it sealingly engages a large area at the top of the housing 31 and thus prevents the ingress of water, dirt or any foreign matter to the joint interior around the top edge of the housing 31. Because the lip 141 is stretched about the top edge of the housing 31 and because it has such a large area of contact, the seal 140 does not require the use of a wire ring or a garter spring such as the spring 50 of the FIGS. 2–4 form of the invention. This eliminates material cost and labor that exceeds the cost of the additional material required for the lip 141. As can be seen from FIG. 6, the lip 141 has a tapered lower edge, as shown at 144, that improves the flexibility and stretchability of the lip lower edge so that it can sealingly conform to the outer face of the housing 31 under all conditions.

FIG. 7 shows a sectional elevation of the upper ball joint assembly 21 shown in FIG. 1. The upper control arm 13 may be a sheet metal stamping having an upstanding collar 61 into which a ball joint housing 62 is screw connected. Housing 62 journals the ball-type head 63 of the stud 64 that has the threaded lower end 65 of the stud shank portion connected to the steering knuckle 20 by the nut 66. The stud ball 63 is urged into bearing relationship with the interior walls 67 of the housing 62 by the resiliently mounted bearing cap 68. Cap 68 is acted on by the compressed rubber washer 69 that is sandwiched between the bearing cap 68 and the cover plate 70. Cover plate 70 mounts a lubricant supply plug or fitting 74 to permit inspection and lubrication of the ball joint assembly.

Connected between the ball joint housing 62 and the top surface 71 of the steering knuckle 20 is another balloon type, flexible boot or seal 81 embodying this invention. Seal 81 is substantially a cup-shaped, flexible walled, boot element having an opening in the bottom that is adapted to sealingly receive the shank of the stud 64. Embedded in the outer side of the bottom wall of the seal 81 is a wear resistant, plastic, self-lubricating washer 83. Washer 83 provides a sealed bearing connection between the bottom wall of the seal and the knuckle upper surface 71. The washer bearing 83 has its outer face crossed by sets of grooves 84 that provide lubricant escape channels so that the seal 81 will not be ruptured in the event an excess of grease is supplied to the joint and seal interior. It will be noted that the outer wall of the flexible boot 81 extends around the outer periphery of the plastic washer 83 so that an outer sealing lip 85 is provided to keep dirt, water or other foreign matter from reaching the interiorly positioned plastic washer 83. The washer outer periphery may have a peripheral groove 86 that allows for freedom of movement of the outer sealing lip 85. The inner peripheral surface 82 of the bearing washer 83 fits closely about the shank of the stud 64 as clearly shown in FIG. 7. Bearing washer 83 has an upper outwardly projecting peripheral rim 88 that provides a reinforcement for the lower side wall portion 89 of the sealing boot 81. The rim 88 projects upwardly and radially outwardly at approximately the same angle as the seal lower wall portions 89. The outwardly and upwardly diverging wall portions 89 terminate at the lower edges of the upper cylindrical wall portion 90. A sealing rib 87 of the rubber-like seal material extends about the inner periphery of the bearing ring 83. The upper edge of the cylindrical wall portion 90 is enlarged to provide a radially outwardly extending flange portion 92 that provides an enlarged sealing surface for face-to-face sealing engagement with the under surface 94 of the upper control arm 13. To improve the wearability of the sealing flange 92 it is covered with a substantially U-shaped metal rim 96 that has a leg portion 97 that is adapted to be engaged by the threaded outer periphery of the ball joint housing 62 (see FIG. 7). The metal reinforced upper rim leg 97 of the seal 81 is normally pressed on the lower edge portion of the housing 62 so that a positive sealed connection is obtained between the rim 96 and the underside surface 94 of the upper control arm 13. Because of the positive connection at the top edge of the boot seal 81, it is apparent why the lubricant bleed grooves 84 are provided at the lower edge of the boot 81.

FIG. 11 shows a seal 110, quite similar to the FIGS. 7–10 form of this invention, applied to a steering tie rod ball joint connection. It will be noted that the seal 110 has a metal reinforced rim 111 at its lower end that is adapted to be mounted on the housing 112 by means of a press-fit connection. The upper wall portions 114 of the flexible sealing boot 110 are thickened similar to the portion 89 of the FIGS. 7–10 form of this invention. A self-lubricating, wear resistant, sealing ring 115 is bonded to the upper end of the seal 110 so that it can sealingly engage the underside of the link arm 116. The self-lubricating bearing ring 115 may or may not include a finger rim portion similar to rim 88 in the FIGS. 7–10 embodiment. Such a rim preserves the shape of the boot 110 and prevents rupture thereof. Lubricant bleed grooves may be provided in the ring 115. This tie rod ball joint is shown to be substantially covered by a snap-on, flexible, rubber-like protecting boot 121 that has a cut out portion 122 to fit around the tie rod 124. Boot 121 protects the lubricant retaining seal 110 from the danger of being cut by flying stones or the like that may be thrown up by the vehicle wheels during vehicle movement.

The several types of lubricant retaining seals shown provide what is currently termed "permanently lubricated ball joints" in the motor vehicle industry. These joints extend the period of inspection for service from the prior required 2,000-mile interval to an approximately 32,000-mile interval.

We claim:

1. A snap-on ball joint seal comprising a resilient, thin-walled, cup-shaped element of rubber-like material including a bottom end wall portion having an opening therein to sealingly engage a ball joint stud shank and side wall portions to sealingly interconnect a ball joint housing and an associated member connected to the housing by the ball joint stud, said seal bottom end wall portion having a ring of bearing material bonded to the outer side thereof and surrounding said opening with an outer face of said bearing ring arranged to have bearing contact with said associated member and the inner peripheral edge portion of said ring being adapted for bearing contact with said stud shank to locate the seal thereon, an upstanding, annular, substantially axially extending, flexible lip on said seal side wall portions arranged peripherally about and extending axially beyond said bearing ring and arranged to be compressed against said associated member to provide a sealing ring around said bearing ring, an annular, radially outwardly extending peripheral flange portion on the seal side wall portions adjacent the cup open end and an annular, axially extending lip means depending from said flange at the cup open end to contractively seal against the ball joint housing, said cup side wall portions having a stepped, annular sealing rib means extending radially inwardly from the interior surface thereof adjacent said flange at the cup open end to seal against said housing.

2. A snap-on ball joint seal comprising a resilient, thin-walled, cup-shaped element of rubber-like material including a bottom end wall portion having an opening therein to sealingly engage a ball joint stud shank and side wall portions to sealingly interconnect a ball joint housing and an associated member connected to the housing by the ball joint stud, said seal bottom end wall portion having a ring of self-lubricating bearing material bonded to the outer side thereof and surrounding said opening with an outer face of said self-lubricating bearing ring arranged to have bearing contact with said associated member and the inner peripheral edge portion of said ring being adapted for bearing contact with said stud shank to locate the seal thereon, an upstanding, annular, substantially axially extending, flexible lip on said seal side wall portions arranged peripherally about and extending axially beyond said bearing ring and arranged to be compressed against said associated member to provide a sealing ring around said bearing ring, an annular, radially outwardly extending peripheral flange portion on the seal side wall portions adjacent the cup open end and an annular, axially extending lip means depending from said flange at the cup open end to contractively seal against the ball joint housing, said cup side wall portions having an annular, stepped, sealing rib means extending radially inwardly from the interior surface thereof adjacent said flange at the cup open end.

3. A snap-on ball joint seal comprising a resilient, thin-walled, cup-shaped element of rubber-like material including a bottom end wall portion having an opening therein to sealingly engage a ball joint stud shank and side wall portions to sealingly interconnect a ball joint housing and an associated member connected to the housing by the ball joint stud, said seal bottom end wall portion having a ring of bearing material bonded to the outer side thereof and surrounding said opening with an outer face of said bearing ring arranged to have bearing contact with said associated member and the inner peripheral edge portion thereof being adapted for bearing contact with said stud shank to locate the seal thereon, an annular, substantially axially extending, upstanding flexible lip at said seal bottom end arranged peripherally about and extending axially beyond said bearing ring and arranged to be compressed against said associated member to provide a sealing ring around said bearing ring, an annular, radially outwardly extending peripheral flange portion on the seal side wall portions adjacent the cup open end and an annular, axially extending lip means depending from said flange at the cup open end to contractively seal against the ball joint housing, said seal side wall portions comprising first portions adjacent said bearing ring diverging radially outwardly therefrom toward the cup open end and merging into a substantially cylindrical second portion that connects the diverging portions to the flange at the open end of the cup-like seal, said cup side wall portions having an annular, radially inwardly extending, sealing rib means on the interior surface thereof adjacent said flange at the cup open end.

4. A snap-on ball joint seal comprising a resilient, thin-walled, cup-shaped element of rubber-like material including a bottom end wall portion having an opening therein to sealingly engage a ball joint stud shank and side wall portions arranged to sealingly interconnect a ball joint housing and an associated member connected to the housing by the ball joint stud, said seal bottom end wall portion having a ring of self-lubricating bearing material bonded to the outer side thereof and surrounding said opening with an outer face of said self-lubricating bearing ring arranged to have bearing contact with said associated member and the inner peripheral edge portion thereof being adapted for bearing contact with said stud shank to locate the seal thereon, an annular, substantially axially extending, upstanding flexible lip at said seal bottom end arranged peripherally about and extending axially beyond said bearing ring and arranged to be compressed against said associated member to provide a sealing ring around said bearing ring, and annular, radially outwardly extending peripheral flange portion on the seal side wall portions adjacent the cup open end and an annular, axially extending lip means depending from said flange at the cup open end to contractively seal against the ball joint housing, said seal side wall portions comprising portions adjacent said bearing ring diverging radially outwardly therefrom toward the cup open end and merging into a substantially cylindrical portion that connects the diverging portions to the flange at the open end of the cup-like seal, said cup side wall portions having an annular, stepped, radially inwardly extending, sealing rib means on the interior surface thereof adjacent the flange at the cup open end to engage the ball joint housing.

5. A snap-on ball joint seal comprising a resilient, thin-walled, cup-shaped element of rubber-like material including a bottom end wall portion having an opening therein arranged to sealingly engage a ball joint stud shank and side wall portions arranged to sealingly interconnect a ball joint housing and an associated member connected to the housing by the ball joint stud, said seal bottom end wall portion having a ring of self-lubricating bearing material bonded to the outer side thereof and surrounding said opening with an outer face of said self-lubricating bearing ring arranged to have bearing contact with said associated member and the inner peripheral edge portion thereof being adapted for bearing contact with said stud shank to locate the seal thereon, an annular, axially extending, upstanding flexible lip on said seal bottom wall arranged peripherally about and extending axially beyond said bearing ring and arranged to be compressed against said associated member to provide a sealing ring around said bearing ring, an annular, radially outwardly extending peripheral flange portion on the seal side wall portions adjacent the cup open end, and annular, radially inwardly extending, sealing rib means on the interior surface of the seal side wall portions substantially adjacent said radially outwardly extending peripheral flange portion and an annular, axially extending lip means depending from said flange at the cup open end to contractively seal against the ball joint housing, said seal bottom end wall having a ring of rubber-like material projecting radially inwardly beneath the inner perpihery of the opening in the bearing ring to provide a sealing rib to engage against the shank of the ball joint stud to be inserted through the opening in the seal bottom end wall.

References Cited by the Examiner

UNITED STATES PATENTS

| | | |
|---|---|---|
| 2,559,857 | 7/51 | Edwards. |
| 2,707,645 | 5/55 | Moskovitz. |
| 2,832,616 | 4/58 | Morse. |
| 2,885,248 | 5/59 | White. |
| 2,921,809 | 1/60 | Kogstrom. |
| 2,936,188 | 5/60 | Moskovitz. |
| 2,971,787 | 2/61 | Lincoln. |
| 2,974,975 | 3/61 | Thomas. |

FOREIGN PATENTS 925,238    4/55    Germany.

CARL W. TOMLIN, *Primary Examiner.*

THOMAS F. CALLAGHAN, WILLIAM FELDMAN,
*Examiners.*